US009164898B2

(12) United States Patent
Bates et al.

(10) Patent No.: US 9,164,898 B2
(45) Date of Patent: Oct. 20, 2015

(54) ADMINISTERING THERMAL DISTRIBUTION AMONG MEMORY MODULES OF A COMPUTING SYSTEM

(75) Inventors: Cary L. Bates, Rochester, MN (US); Nicholas P. Johnson, Rochester, MN (US); Justin K. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 13/228,898

(22) Filed: Sep. 9, 2011

(65) Prior Publication Data

US 2013/0067136 A1 Mar. 14, 2013

(51) Int. Cl.
*G06F 12/00* (2006.01)
*G06F 13/00* (2006.01)
*G06F 13/28* (2006.01)
*G06F 12/02* (2006.01)
*G06F 9/50* (2006.01)

(52) U.S. Cl.
CPC .......... *G06F 12/0253* (2013.01); *G06F 9/5094* (2013.01); *G06F 12/00* (2013.01); *G06F 12/0238* (2013.01); *Y02B 60/142* (2013.01)

(58) Field of Classification Search
CPC ............ G06F 12/0246; G06F 12/0253; G06F 2212/1036
USPC .......................................... 711/103, 165, 170
See application file for complete search history.

(56) References Cited

U.S. PATENT DOCUMENTS

| 5,502,838 | A | 3/1996 | Kikinis |
| 5,530,850 | A * | 6/1996 | Ford et al. ..................... 707/813 |
| 7,191,088 | B1 | 3/2007 | Reed et al. |
| 2007/0257359 | A1 | 11/2007 | Reis et al. |
| 2008/0052483 | A1 | 2/2008 | Rangarajan et al. |
| 2008/0120485 | A1 | 5/2008 | Rothman et al. |

(Continued)

FOREIGN PATENT DOCUMENTS

| CN | 101615106 A | 12/2009 |
| CN | 101813965 A | 8/2010 |

OTHER PUBLICATIONS

Denis Howe, "Free Online Dictionary of Computing—logical address" Last updated: Jan. 2, 2001. http://foldoc.org/logical+address.*

(Continued)

*Primary Examiner* — Charles Rones
*Assistant Examiner* — Sidney Li
(74) *Attorney, Agent, or Firm* — James R. Nock; Nicholas D. Bowman

(57) ABSTRACT

A computing system includes a number of memory modules and temperature sensors. Each temperature sensor measures a temperature of a memory module. In such a computing system a garbage collector during garbage collection, determines whether a temperature measurement of a temperature sensor indicates that a memory module is overheated and, if a temperature measurement of a temperature sensor indicates a memory module is overheated, the garbage collector reallocates one or more active memory regions on the overheated memory module to a non-overheated memory module. Reallocating the active memory regions includes copying contents of the active memory regions from the overheated memory module to the non-overheated memory module.

8 Claims, 4 Drawing Sheets

(56) References Cited

U.S. PATENT DOCUMENTS

2008/0162611 A1* 7/2008 Wolczko et al. ............. 707/206
2011/0225346 A1* 9/2011 Goss et al. ................... 711/103

OTHER PUBLICATIONS

Revenbrook. "The Memory Management Reference—Glossary V" Retrieved Apr. 30, 2014 http://www.memorymanagement.org/glossary/v.html.*

Basten et al., "Thermal-Aware Scratchpad Memory Design and Allocation," *2010 IEEE International Conference on Computer Design (ICCD)*, Oct. 3, 2010, pp. 1-7, Digital Object Identifier: 10.1109/ICCD.2010.5647616, The Netherlands.

Kim et al.; "Temperature-Aware Compilation for VLIW Processors," *13th IEEE Conference on Embedded and Real-time Computing Systems and Applications (RTCSA 2007)*, pp. 426-431, Aug. 2007, Korea.

Atienza et al., "Thermal-Aware Data Flow Analysis," *Design Automation Conference, 2009 (DAC '09. 46th ACM/IEEE*, Jul. 2009, pp. 613-614, San Francisco, California, USA.

Atienza et al., "Thermal-Aware Compilation for System-On-Chip Processing Architectures," *Proceedings of the 20th Symposium on Great Lakes Symposium on VLSI*, Digital Object Identifier: 10.1145/1785481.1785535, May 2010, pp. 221-226, Providence, Rhode Island, USA.

Orailoglu et al., "Processor Reliability Enhancement Through Compiler-Directed Register File Peak Temperature Reduction," *IEEE/IFIP International Conference on Dependable Systems & Networks, 2009. DSN '09*, Digital Object Identifier: 10.1109/DSN.2009.5270305, Jun. 2009, pp. 468-477, Portugal.

David et al., "Thermal Modeling and Management of DRAM Memory Systems," *ISCA '07 Proceedings of the 34th Annual International Symposium on Computer Architecture*, Digital Object Identifier: 10.1145/1273440.1250701, May 2007, pp. 312-322, New York, USA.

Liu et al., "A Power and Temperature Aware DRAM Architecture," *DAC '08 Proceedings of the 45th annual Design Automation Conference*, Digital Object identifier: 10.1145/1391469.1391691, Jun. 2008, pp. 1-6, New York, USA.

David et al., "Software Thermal Management of Dram Memory for Multicore Systems," *SIGMETRICS '08 Proceedings of the 2008 ACM SIGMETRICS International Conference on Measurement and Modeling of Computer Systems*, Digital Object Identifier: 10.1145/1375457.1375496, Jun. 2008 pp. 337-348, New York, US.

* cited by examiner

US 9,164,898 B2

ADMINISTERING THERMAL DISTRIBUTION AMONG MEMORY MODULES OF A COMPUTING SYSTEM

BACKGROUND OF THE INVENTION

1. Field of the Invention

The field of the invention is data processing, or, more specifically, methods, apparatus, and products for administering thermal distribution among memory modules of a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

During operation of a computer, memory modules such as Dual In-line Memory Modules (DIMMs), may generate a large amount of heat. Heat generation may cause degradation and eventually failure of DIMMs over time. Current program execution may create a disproportionate distribution of heat generation among many DIMMs or even among modules of one DIMM. That is, in a memory system that includes a number of DIMMs, a subset of the DIMMs may be accessed many more times than other DIMMs in the system. This disproportionate accessing may cause the subset of DIMMs to generate far more heat over time than other DIMMs. Such disproportionate heat generation may effect degradation of the subset of DIMMs more quickly than the other DIMMs in the system. That is, the operating life of each DIMM in the subset of DIMMs that is accessed more frequently is consumed much more quickly than the operating life of each of the other DIMMs. It would be useful, therefore, to distribute heat generation in a more balanced, even manner amongst all DIMMs in a subsystem.

SUMMARY OF THE INVENTION

Methods, apparatus, and products for administering thermal distribution among memory modules of a computing system are disclosed in this specification. The computing system includes a number of memory modules and a number of temperature sensors, where each temperature sensor measures a temperature of a memory module. Administering thermal distribution among the memory modules in accordance with embodiments of the present invention includes: determining, by a garbage collector during garbage collection, whether a temperature measurement of a temperature sensor indicates that a memory module is overheated and reallocating one or more active memory regions on the overheated memory module to a non-overheated memory module if a temperature measurement of a temperature sensor indicates a memory module is overheated. Reallocating one or more active memory regions on the overheated memory module to a non-overheated memory module in accordance with embodiments of the present invention includes copying contents of the active memory regions from the overheated memory module to the non-overheated memory module.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
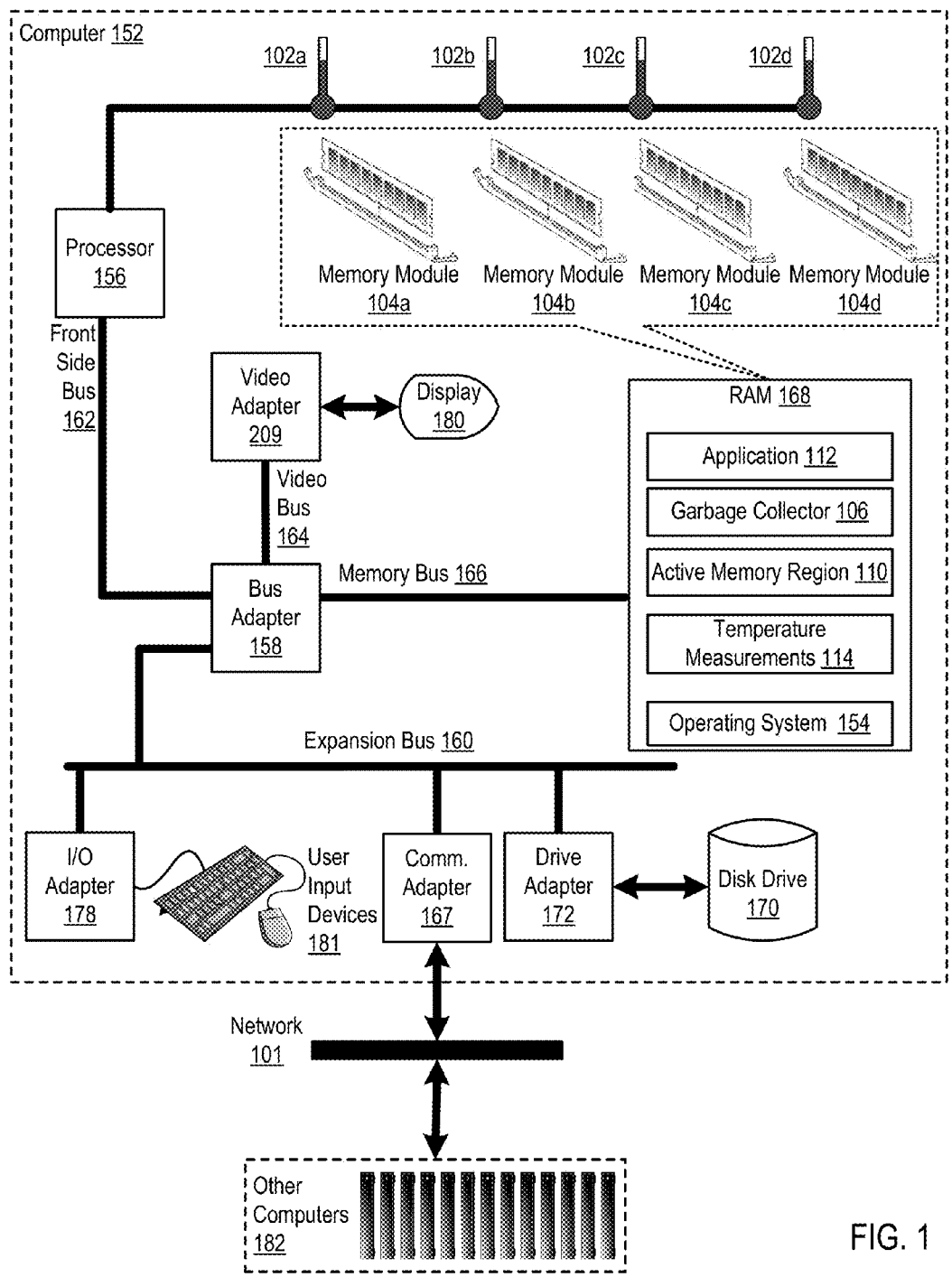
FIG. 1 sets forth a block of a system for administering thermal distribution among memory modules according to embodiments of the present invention.

Exemplary methods, apparatus, and products for administering thermal distribution among memory modules of a computing system in accordance with the present invention are described with reference to the accompanying drawings, beginning with FIG. 1. FIG. 1 sets forth a block of a system for administering thermal distribution among memory modules according to embodiments of the present invention. The system of FIG. 1 includes a includes an exemplary computer (152) that, in turn, includes at least one computer processor (156) or 'CPU' as well as random access memory (168) ('RAM') which is connected through a high speed memory bus (166) and bus adapter (158) to processor (156) and to other components of the computer (152).

In the example computer (152) of FIG. 1, RAM (168) includes several memory modules. The term 'memory module' as used in this specification refers to any unit of computer memory. Examples of a unit of computer memory include: a Dual In-Line Memory Module ('DIMM'); a rank of a DIMM; and a Dynamic Random Access Memory ('DRAM') integrated circuit of a DIMM. In the example of FIG. 1, the computer memory is implemented with four Dual In-line Memory Modules (DIMMs) (104a, 104b, 104c, and 104d). Each DIMM may be considered a separate memory module. Alternatively, each integrated circuit of computer memory on the DIMM itself may be considered a separate memory module. For ease explanation—not limitation—each DIMM (104a-104d) in the example of FIG. 1 is referred to as a separate memory module.

In the example of FIG. 1, a separate temperature sensor (102a, 102b, 102c, 102d) is associated with each DIMM (104a-104d) in that each temperature sensor measures the temperature of one DIMM. Temperature sensors are depicted in the example of FIG. 1 as components separate from the DIMMs themselves, but readers of skill in the art will recognize that such temperature sensors may be implemented in a variety of manners—on a motherboard, in or near a DIMM slot of the motherboard, on the DIMM itself, and so on. Each such implementation is well within the scope of the present invention.

The temperature sensors (102a-102d) are coupled to the processor (156) in the example of FIG. 1. In such an embodiment, the temperature sensor may store a present temperature of a memory module in a designated, well known processor register periodically or upon request, or may raise an interrupt or flag when the temperature of a memory module exceeds a predetermined threshold. The temperature sensors (102a-102d) are depicted in the example of FIG. 1 as being coupled to the processor (156) for clarity of explanation, not limitation. Readers of skill in the art will recognize that temperature sensors (102a-102d) capable of measuring temperature of a memory module may be operatively coupled in a variety of ways. For example, temperature sensors may be coupled to an expansion bus (160) through an Input/Output (I/O) adapter (178), coupled to a service processor (not shown) through an out-of-band bus, or in other ways as will occur to readers of skill in the art.

Stored in RAM (168) are an application (112) and a garbage collector (106). The application (112) is a module of computer program instructions that carries out user-level data processing tasks. Examples of such applications include spreadsheet applications, word processing applications, multimedia library management applications, database management applications, photo or video editing applications, email client applications, and so on as will occur to readers of skill in the art.

As the application executes, memory may, from time to time, be allocated and used by the application for data storage and retrieval. The application may then cease using the memory, without freeing the memory for future allocation. The application, for example, may instantiate an object, use the object for some time, and then cease using the object. The memory in which the object is instantiated is not available for allocation to other applications.

To that end, the garbage collector (106) in the example of FIG. 1 is a module of computer program instructions that reclaims garbage, or memory occupied by objects that are no longer in use by an application. Garbage collection is often portrayed as in contrast to manual memory management, which requires a programmer to specify objects to deallocate and free memory for future allocation. A garbage collector performs typical garbage collection by periodically identifying, marking, and deleting inactive memory regions while compacting active memory regions into contiguous blocks. The garbage collector is said to 'delete' an inactive memory region in that the memory region is deallocated or freed. Once freed, the garbage collector may effectively move an active memory region into the freed memory region such that the active memory region becomes a part of a contiguous block of active memory regions.

In the example of FIG. 1, the garbage collector (106) is also configured to administer thermal distribution among memory modules of a computing system in accordance with embodiments of the present invention. That is, in addition to the garbage collector's typical garbage collection operations, the garbage collector (106) in the example of FIG. 1 also supports administration of thermal distribution in the computing system—the computer (152). The garbage collector (106) carries out such thermal distribution administration among the memory modules of the computer (152) by determining, during garbage collection, whether a temperature measurement (114) of a temperature sensor (102a-102d) indicates that a memory module (104a-104d) is overheated. In the example of FIG. 1, the garbage collector may determine whether a memory module (104a-104d) is overheated in real time—that is, during normal execution of the garbage collector, without user interaction. No user request is required for the garbage collector to determine whether a memory module in the target computing system (152) is overheated.

If a temperature measurement (114) of a temperature sensor (102a-102d) indicates a memory module (104a-104d) is overheated, the garbage collector (106) reallocates one or more active memory regions (110) on the overheated memory module (104a) to a non-overheated memory (104b) module. The reallocation of the active memory region (110) to a non-overheated memory module (104b) includes copying contents of the active memory regions from the overheated memory module (104a) to the non-overheated memory module (104b).

Said another way, when a memory module is overheated, the garbage collector (106) operates in a thermal-aware mode, rather than a typical operating mode. In the thermal-aware mode, rather than reclaiming inactive memory regions as in a typical operating mode, the garbage collector operates on active memory regions—effectively moving an active memory region on an overheated memory module to another, non-overheated memory module.

Each access to an active memory region may cause heat to be generated on the memory module upon which the active memory region is allocated. By reallocating the active memory region from an overheated to a non-overheated memory module, the garbage collector directs subsequent access to the active memory region away from the overheated memory module, reducing the overall number of access to the memory module. Reducing the overall number of access to the memory module reduces the heat generated by the memory module, allowing the memory module to cool.

Upon the temperature sensors (102a-102d) indicating the memory module is no longer overheated, the garbage collector (106) exits the thermal-aware execution state. That is, after the temperature of the overheated memory module drops below a predetermined threshold, the garbage collector (106) will operate in a normal manner, collecting garbage, reclaiming inactive memory regions and aligning active memory regions into contiguous blocks of memory without regard to the memory module upon which the active memory regions are allocated.

Also stored in RAM (168) is an operating system (154). Examples of operating systems that support administering thermal distribution among memory modules according to embodiments of the present invention include UNIX™, Linux™, Microsoft XP™, AIX™, IBM's i5/OS™, and others as will occur to those of skill in the art. The operating system (154), user-level application (110), and call stack (106) example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support administering thermal distribution among memory modules according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (socalled 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support administering thermal distribution among memory modules according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
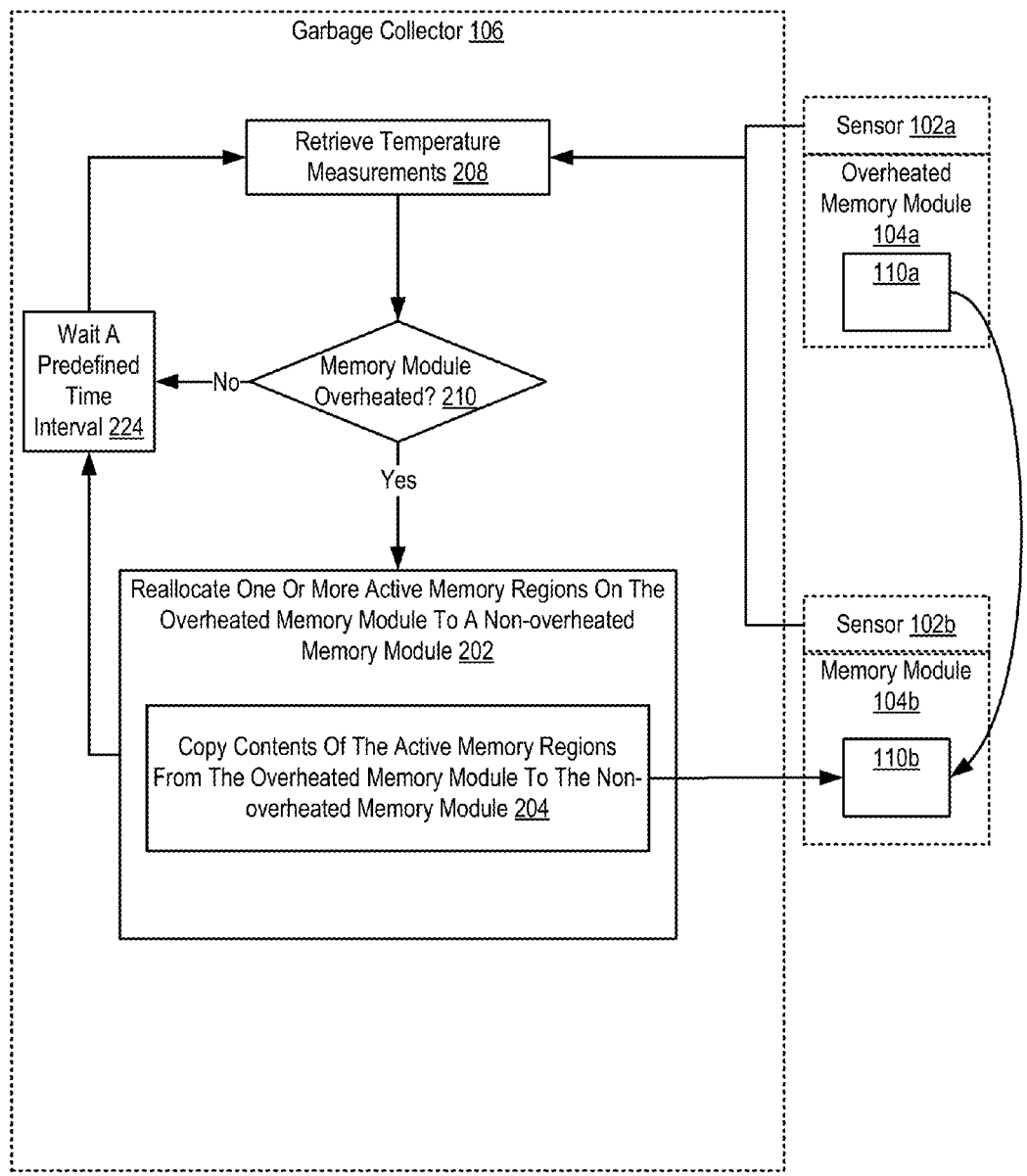
FIG. 2 sets forth a flow chart illustrating an exemplary method for administering thermal distribution among memory modules of a computing system according to embodiments of the present invention.

For further explanation, FIG. 2 sets forth a flow chart illustrating an exemplary method for administering thermal distribution among memory modules of a computing system according to embodiments of the present invention. The method of FIG. 2 is carried out in a computing system, similar to the computer (152) of FIG. 1. The computing system in which FIG. 2 is carried out includes a number of memory modules and a number of temperature sensors. Each temperature sensor measures a temperature of a memory module in the computing system. The method of FIG. 2 is also carried out by a garbage collector (106) during garbage collection.

The method of FIG. 2 includes retrieving (208) temperature measurements of one or more of the computing system's temperature sensors (102a, 102b). Retrieving (208) temperature measurements of one or more of the computing system's temperature sensors (102a, 102b) may be carried out in various ways depending on the implementation of the temperature sensors. In embodiments in which the temperature sensors (102a, 102b) are configured to interrupt the processor when a memory module's temperature exceeds a threshold, the garbage collector (106) may retrieve temperature measures by providing an interrupt handler that identifies the memory module responsive to such an interrupt. In embodiments in which each temperature sensor periodically stores a present temperature of a memory module, the garbage collector (106) may retrieve the contents of that register periodically and determine whether the value stored in the register is greater than a predefined threshold. Readers of skill in the art will recognize that these are but two ways among many possible ways to retrieve (208) temperature measurements of temperature sensors.

The method of FIG. 2 continues by determining (210), by the garbage collector (106) in real-time during garbage collection and in dependence upon the temperature measurements, whether a memory module is overheated. Determining (210) whether a memory module is overheated may be carried out in various ways. For example, determining whether a memory module is overheated may be carried out by determining, for each temperature measurement, whether the measured temperature of a memory module is greater than a predetermined threshold temperature.

If no memory module is overheated, the method of FIG. 2 continues by waiting (224) a predefined period of time and again retrieving (208) temperature measurements followed by a determination (210) of whether a memory module is overheated. That is, in the method of FIG. 2, retrieving (208) temperature measurements of one or more of the computing system's temperature sensors and determining (210) whether a memory module is overheated is carried out periodically at a predefined interval of time. The predefined interval of time may be specified in various ways and need not be limited to minutes and seconds. Instead, the interval may be specified as a number of executed instructions, a number of execution subroutines, a number of function calls, a number of returns from a subroutine, and so on as will occur to readers of skill in the art. Although FIG. 2 depicts retrieving (208) and determining (210) being carried out in a periodic fashion, such retrieving and determination may be carried out asynchronously responsive to interrupts raised when a memory module's temperature exceeds a predetermined threshold.

If a temperature measurement of a temperature sensor indicates a memory module is overheated, the method of FIG. 2 continues by reallocating (202) one or more active memory regions on the overheated memory module (104a) to a non-overheated memory module (102b). In the example of FIG. 2, reallocating (202) one or more active memory regions is carried out by copying (204) contents of the active memory regions (110a) from the overheated memory module to the non-overheated memory module (110b). Garbage collectors of the prior art typically include tools for reallocation of memory regions. In normal, prior art application, however, those tools are used to deallocate or delete an inactive memory region and move contents of an active memory region 'up,' into the deallocated memory region and into a contiguous block of active memory regions. In the method of FIG. 2, by contrast, the garbage collector reallocates or moves an active memory from one memory module to another. Such reallocation (202) may be carried out by on a non-overheated memory module a memory region of a same size as an active memory region to be reallocated from the overheated memory module and copying (204) the contents of the active memory region on the overheated memory module to the newly allocated region on the non-overheated memory module. The garbage collector (106) in some embodiments may free or deallocate the active memory region on the overheated memory module, without moving any other active memory region into the free memory space. In this way, the space remains unused and thus, not accessed, and heat generated responsive to such memory accesses will be reduced. In other embodiments, after reallocating the active memory region to the non-overheated memory module, the garbage collector (106) may not free the active memory region on the overheated memory module, thus ensuring that the memory region will not be accessed for some time.

Once, the garbage collector (106) reallocates (202) one or more active memory regions (110a) on the overheated memory module (104a) to the non-overheated memory module (104b), the garbage collector (106) waits (224) a predefined time interval before again retrieving (208) temperature measurements and determining (210) whether a memory module is overheated. During the waiting period, the garbage collector may be configured to continue normal garbage collection on memory module other than the overheated memory module.

Figure 3:
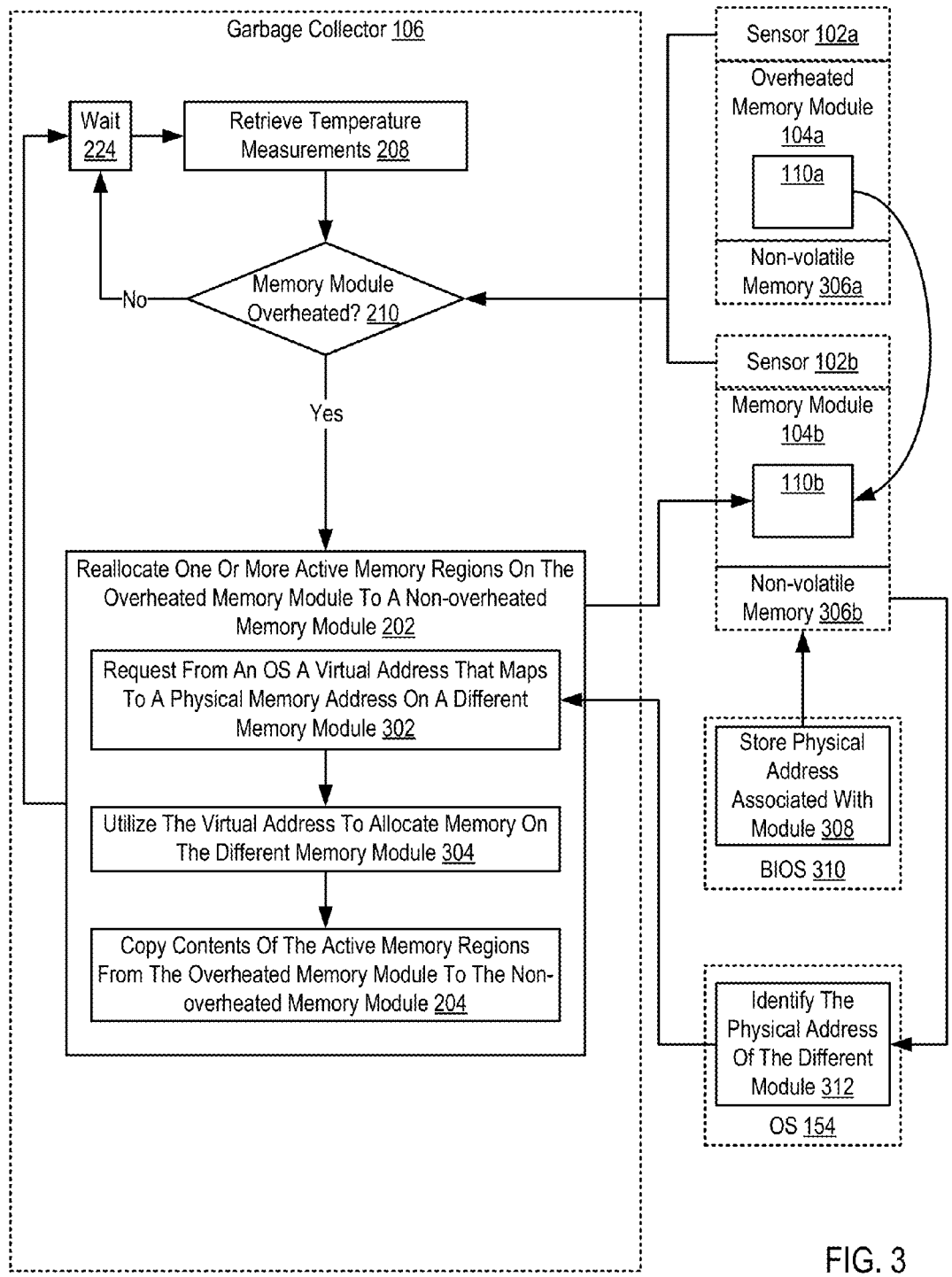
FIG. 3 sets forth a flow chart illustrating a further exemplary method for administering thermal distribution among memory modules of a computing system according to embodiments of the present invention.

For further explanation, FIG. 3 sets forth a flow chart illustrating a further exemplary method for administering thermal distribution among memory modules of a computing system according to embodiments of the present invention. The method of FIG. 3 is similar to the method of FIG. 2 in that the method of FIG. 3 is carried out in a computing system that includes a number of memory modules and temperature sensors, where each temperature sensor measures a temperature of a memory module. The method of FIG. 3 is also similar to the method of FIG. 2 in that the method of FIG. 3 includes retrieving temperature measurements (208), determining (210), by a garbage collector (106) during garbage collection, whether a temperature measurement of a temperature sensor indicates that a memory module is overheated, and if a temperature measurement of a temperature sensor indicates a memory module is overheated, reallocating (202) one or more active memory regions on the overheated memory module to a non-overheated memory module including copying (204) contents of the active memory regions from the overheated memory module to the non-overheated memory module.

The method of FIG. 3 differs from the method of FIG. 2, however, in that the method of FIG. 3 includes storing (308) by a Basic Input/Output Services (310) module, in non-volatile memory (306a, 306b) of each memory module (104a, 104b) of the computing system upon startup of the computing system a physical memory address associated with the memory module. In a computer memory subsystem including multiple memory modules, such as two DIMMs, each memory module represents a range of separate physical addresses. In the example of FIG. 3, BIOS (310) stores at boot time an identification of each memory module's associated physical address range. In this way, a module of automated computing machinery—such as the garbage collector (106) or the operating system (154)—may inspect the contents of a memory module's non-volatile memory (306) to identify a physical address on that memory module. Readers of skill in the art will recognize that such storage of physical address to memory module associations need not be carried out only by a BIOS module. Instead, any firmware, software, operating system or operating system component, may store such associations in the non-volatile memory of the memory modules (104a, 104b).

In the method of FIG. 3, reallocating (202) one or more active memory regions on the overheated memory module to a non-overheated memory module includes requesting (302) from an operating system (154) of the computing system, a virtual address that maps to a physical memory address on a different memory module other than the overheated memory module (104a). Such a request (302) may be a call to an operating system function that includes as a parameter passed to the function a memory module identifier.

Garbage collectors and other applications are typically unaware of the physical address space associated with allocated memory regions. Instead, the garbage collector is aware of only an application's virtual address space, provided to the application and managed by the operating system. The operating system (154) in the example of FIG. 3 is configured to receive the request for a virtual address that maps to a physical address of a different memory module. Responsive to that request the operating system identifies (312) a physical memory address of the different memory module from the associations stored in the different memory module's non-volatile memory (306a, 306b).

In the method of FIG. 3, the garbage collector (106) receives, as a response to the request (302), the virtual address that maps to a physical address on another memory module (104b) and utilizes (304) the virtual address to allocate memory on the different, non-overheated memory module (104b). Such an allocation may be carried out with a call to an operating system function having as parameters passed to the function, the virtual address received from the operating system and an offset specifying the size of the memory region to allocate beginning at the virtual address.

Figure 4:
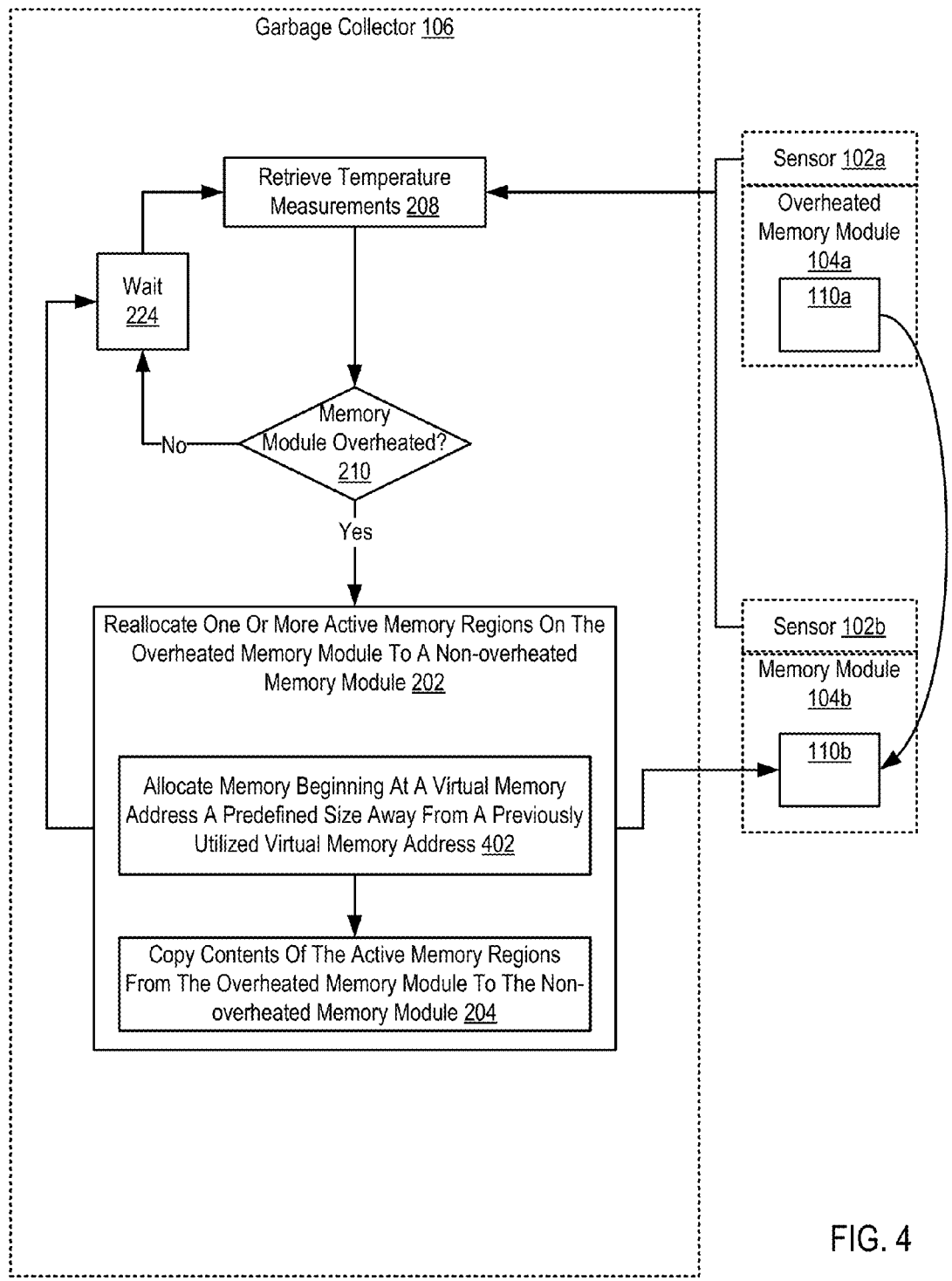
FIG. 4 sets forth a flow chart illustrating a further exemplary method for administering thermal distribution among memory modules of a computing system according to embodiments of the present invention.

For further explanation, FIG. 4 sets forth a flow chart illustrating a further exemplary method for administering thermal distribution among memory modules of a computing system according to embodiments of the present invention. The method of FIG. 4 is similar to the method of FIG. 2 in that the method of FIG. 4 is carried out in a computing system that includes a number of memory modules and temperature sensors, where each temperature sensor measures a temperature of a memory module. The method of FIG. 4 is also similar to the method of FIG. 2 in that the method of FIG. 4 includes retrieving temperature measurements (208), determining (210), by a garbage collector (106) during garbage collection, whether a temperature measurement of a temperature sensor indicates that a memory module is overheated, and if a temperature measurement of a temperature sensor indicates a memory module is overheated, reallocating (202) one or more active memory regions on the overheated memory module to a non-overheated memory module including copying (204) contents of the active memory regions from the overheated memory module to the non-overheated memory module.

The method of FIG. 4 differs from the method of FIG. 2, however, in that in the method of FIG. 4, reallocating (202) one or more active memory regions on the overheated memory module to a non-overheated memory includes allocating (402) memory beginning at a virtual memory address a predefined size away from the active memory region on the overheated memory module.

Many operating systems are configured to allocate memory regions in a physically contiguous fashion; one memory region, followed by another, by another, with little to no free space in between. So, even in computing environments that operating with virtual addresses, the virtual addresses generally correspond to similar physical addresses. As such, a garbage collector (106) with some knowledge of the memory subsystem such as for example, knowledge of the size of each memory module, may allocate memory on another non-overheated memory module by requesting the operating system to allocate the memory at a virtual address, that if the virtual address maps directly to the same or nearly the same physical address would necessarily reference another memory module. Consider for example a memory subsystem composed of two, 1 GB DIMMs. Consider that the first DIMM is overheated, the garbage collector is executing in a thermal-aware state, and the active memory region to be reallocated (202) begins at a virtual address that, if the same as a physical address, would reference a memory location 512 MB from the overheated memory module's initial memory address. Given the typical close nature of an operating system's virtual address to physical address mapping, the physical address that maps to virtual address of that memory region, although unknown to the garbage collector, is likely at or near 512 MB from the memory module's initial memory address—roughly beginning at the halfway point of the overheated DIMM. As such, allocating (402) a memory region at a virtual memory address 1 GB from the previously utilized virtual memory address of the active memory region will in most cases result in memory allocation on a different memory module—again, relying on the typically close relationship of virtual to physical address mappings by the operating system. The example allocation (402) is a type of educated guess carried out by the garbage collector of a virtual address that maps to a physical address on another memory module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for administering thermal distribution among memory modules of a computing system, the computing system comprising a plurality of memory modules and a plurality of temperature sensors, each temperature sensor measuring a temperature of one of the plurality of memory modules, the apparatus comprising a computer processor, a computer memory operatively coupled to the computer processor, the computer memory having disposed within it computer instructions that, when executed by the computer processor, cause the apparatus to carry out the steps of:
   determining, by a garbage collector during garbage collection, whether the temperature measurement of one of the plurality of temperature sensors indicates that one of the plurality of memory modules is overheated; and
   if the temperature measurement indicates that the one of the plurality of memory modules is overheated, reallocating one or more active memory regions on the overheated memory module to a non-overheated memory module, including:
   copying contents of the active memory regions from the overheated memory module;
   allocating memory beginning at a virtual memory address a predefined size away from the active memory region on the overheated memory module; and
   writing the contents of the active memory regions from the overheated memory module to the allocated memory.

2. The apparatus of claim 1, wherein reallocating one or more active memory regions on the overheated memory module to a non-overheated memory module further comprises requesting from an operating system of the computing system, the virtual memory address, the virtual memory address mapping to a physical memory address on the non-overheated memory module and utilizing the retrieved virtual memory address during the allocation of the memory, the apparatus further comprising computer program instructions that, when executed by the computer processor, cause the apparatus to carry out the steps of:
   storing in non-volatile memory of each memory module upon startup of the computing system at least one physical memory address associated with the memory module; and
   responsive to the request for the virtual memory address, identifying, by the operating system, the physical memory address of the non-overheated memory module from the association stored in the non-overheated memory module's non-volatile memory.

3. The apparatus of claim 1 wherein determining whether the temperature measurement indicates that the one of the plurality of memory modules is overheated further comprises:
   determining whether the temperature measurement of the one of the plurality of the temperature sensors indicates that the memory module is overheated periodically at a predefined interval of time.

4. The apparatus of claim 1 wherein each memory module comprises one of:
   a Dual In-Line Memory Module ('DIMM');
   a rank of a DIMM; and
   a Dynamic Random Access Memory ('DRAM') integrated circuit of a DIMM.

5. A computer program product for administering thermal distribution among memory modules of a computing system, the computing system comprising a plurality of memory modules and a plurality of temperature sensors, each temperature sensor measuring a temperature of one of the plurality of memory modules, the computer program product disposed upon a computer readable medium that is not a signal, the computer program product comprising computer program instructions that, when executed, cause a computer to carry out the steps of:
   determining, by a garbage collector during garbage collection, whether the temperature measurement of one of the plurality of temperature sensors indicates that one of the plurality of memory modules is overheated; and
   if the temperature measurement indicates that the one of the plurality of memory modules is overheated, reallocating one or more active memory regions on the overheated memory module to a non-overheated memory module, including:
   copying contents of the active memory regions from the overheated memory module;
   allocating memory beginning at a virtual memory address a predefined size away from the active memory region on the overheated memory module; and
   writing the contents of the active memory regions from the overheated memory module to the allocated memory.

6. The computer program product of claim 5, wherein reallocating one or more active memory regions on the overheated memory module to a non-overheated memory module further comprises requesting from an operating system of the computing system, the virtual memory address, the virtual memory address mapping to a physical memory address on the non-overheated memory module and utilizing the retrieved virtual memory address during the allocation of the memory, the computer program product further comprising computer program instructions that, when executed, cause the computer to carry out the steps of:
   storing in non-volatile memory of each memory module upon startup of the computing system at least one physical memory address associated with the memory module; and
   responsive to the request for the virtual memory address, identifying, by the operating system, the physical memory address of the non-overheated memory module from the association stored in the non-overheated memory module's non-volatile memory.

7. The computer program product of claim 5 wherein determining whether the temperature measurement indicates that the one of the plurality of memory modules is overheated further comprises:
   determining whether the temperature measurement of the one of the plurality of the temperature sensors indicates that the memory module is overheated periodically at a predefined interval of time.

8. The computer program product of claim 5 wherein each memory module comprises one of:
   a Dual In-Line Memory Module ('DIMM');

a rank of a DIMM; and
a Dynamic Random Access Memory ('DRAM') integrated circuit of a DIMM.

* * * * *